United States Patent [19]
Mori

[11] Patent Number: 5,718,832
[45] Date of Patent: Feb. 17, 1998

[54] LASER BEAM MACHINE TO DETECT PRESENCE OR ABSENCE OF A WORK PIECE

[75] Inventor: Atsushi Mori, Minamitsuru-gun, Japan

[73] Assignee: Fanuc Ltd., Yamanashi, Japan

[21] Appl. No.: 709,670

[22] Filed: Sep. 9, 1996

Related U.S. Application Data

[63] Continuation of Ser. No. 312,273, Sep. 23, 1994, abandoned.

[30] Foreign Application Priority Data

Oct. 15, 1993 [JP] Japan .................................. 5-257941
Oct. 22, 1993 [JP] Japan .................................. 5-264720

[51] Int. Cl.$^6$ .................................................. B23K 26/02
[52] U.S. Cl. .......................... 219/121.83; 219/121.67; 219/121.76; 364/474.08
[58] Field of Search .......................... 219/121.6, 121.63, 219/121.67, 121.76, 121.81, 121.83, 121.62; 364/474.08; 359/155

[56] References Cited

U.S. PATENT DOCUMENTS

| | | | |
|---|---|---|---|
| 5,026,964 | 6/1991 | Somers et al. | 219/121.83 |
| 5,173,584 | 12/1992 | Kahlert et al. | 219/121.83 |
| 5,304,773 | 4/1994 | Kilian et al. | 219/121.83 |

FOREIGN PATENT DOCUMENTS

| | | |
|---|---|---|
| 1-170590 | 7/1989 | Japan . |
| 1-218784 | 8/1989 | Japan . |
| 2-88152 | 3/1990 | Japan . |
| 3-155490 | 7/1991 | Japan . |
| 4-52094 | 2/1992 | Japan . |

*Primary Examiner*—Teresa J. Walberg
*Assistant Examiner*—Gregory L. Mills
*Attorney, Agent, or Firm*—Staas & Halsey

[57] ABSTRACT

A laser beam machine capable of carrying out proper tracing control with ease. A tracing control circuit of a CNC device executes tracing control upon receiving a tracing start command from a CNC main circuit. Specifically, the control circuit is supplied with a detection signal from a height detector and outputs a drive signal to a motor such that the height of a machining head is kept within a predetermined range. A workpiece detector is provided for detecting the presence or absence of a workpiece at the distal end of the machining head. When the workpiece at the distal end of the machining head drops as the machining operation advances, this is detected by the workpiece detector, which then outputs a detection signal to a tracing interrupt circuit. On receiving the detection signal from the workpiece detector, that is, information indicating that there is no workpiece at the distal end of the machining head, the tracing interrupt circuit outputs a tracing interrupt signal to the tracing control circuit. When supplied with the tracing interrupt signal, the tracing control circuit interrupts the tracing control.

8 Claims, 7 Drawing Sheets

LASER BEAM MACHINE TO DETECT PRESENCE OR ABSENCE OF A WORK PIECE

This application is a continuation of application Ser. No. 08/312,273, filed Sep. 23, 1994, now abandoned.

BACKGROUND OF THE INVENTION (1) Field of the Invention

The present invention relates to a laser beam machine for carrying out a machining operation by using a laser beam, and more particularly, to a laser beam machine which carries out a machining operation while controlling the height of the distal end of a machining head.

(2) Description of the Related Art

In laser beam machines, the distance between the focal point and a workpiece must be kept within a predetermined range. To this end, a tracing control system has been employed wherein the distance between the workpiece and a machining head (the height of the machining head) is detected, and the height data is fed back to an axis for controlling the height of the machining head, to thereby keep the height of the machining head constant.

Figure 6:
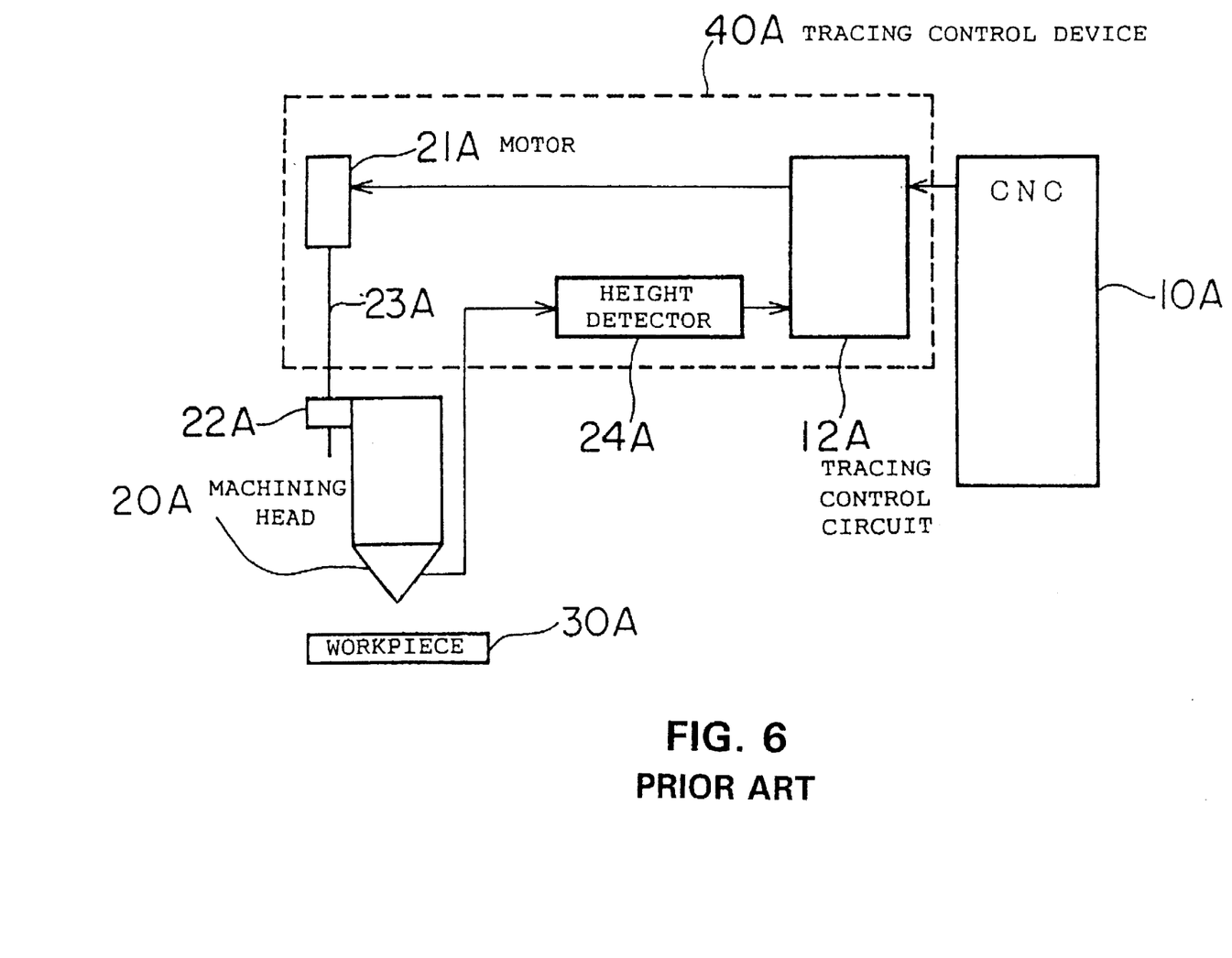
FIG. 6 (PRIOR ART) is a diagram illustrating a laser beam machine equipped with a conventional tracing control system.

FIG. 6 is a diagram illustrating a laser beam machine equipped with such a conventional tracing control system. As illustrated, a machining head 20A of the laser beam machine is provided with a height detector 24A of a tracing control device 40A. The height detector 24A detects a height of the machining head 20A relative to a workpiece 30A, and outputs the detection signal to a tracing control circuit 12A. On receiving a tracing start command from a computer numerical control (CNC) device 10A, the tracing control circuit 12A executes tracing control. Specifically, the tracing control circuit 12A receives the detection signal from the height detector 24A and outputs a drive signal to a motor 21A such that the height of the machining head 20A falls within a predetermined range. Rotation of the motor 21A is transmitted via a ball screw 23A and a nut 22A, whereby the height of the machining head 20A is kept within the predetermined range.

According to this tracing control, the height of the machining head 20A is maintained at a value dependent on a deviation ($E-E_0$) of the detection signal E of the height detector 24A from a control target value $E_0$. This is generally achieved by setting a velocity command V for the control axis (motor 21A) of the machining head 20A such that $V=K \times (E-E_0)$ is fulfilled, where K represents a gain.

However, when the machining head passes above a cut hole or an end of the workpiece during the tracing control of the laser beam machine, the machining head suddenly lowers due to the action of the tracing control because no workpiece exists immediately below the machining head. At the start of machining, on the other hand, the workpiece and the machining head are set apart from each other at a distance beyond the measuring range of the height detector, which is similar to the case where no workpiece exists immediately below the machining head. In this case, it is necessary that the machining head be moved close to the workpiece while controlling the movement thereof.

Therefore, the operator is required to create a machining program such that the tracing control is disabled while the machining head passes in the vicinity of a hole or an end of the workpiece.

Also when laser beam machining is started, a great deal of molten metal particles called sputters scatter during drilling, disturbing the output of the height detector. Therefore, during such period, the tracing control is suspended by the machining program.

In order to detect the gap between the workpiece and the distal end of the machining head, a height sensor is used. Since the laser beam machining is readily influenced by a change in the point of convergence of a laser beam or in the position of the workpiece, the height sensor is used to eliminate such influence. The detection signal of the height sensor is fed back and the height of the machining head is controlled such that the gap between the workpiece and the distal end of the machining head remains constant.

This height control of the machining head by means of the height sensor is, however, premised on the presence of a workpiece at the distal end of the machining head. Accordingly, when the machining head passes above a cut hole or an end of the workpiece and thus no workpiece exists immediately below the machining head, a corresponding feedback control action is executed, with the result that the machining head suddenly lowers.

To prevent such a sudden lowering of the machining head, measures are conventionally taken wherein movement of the machining head is restricted to a certain range such that a stop signal is output when the range is exceeded, or a stop signal is output upon detection of a sudden change in the output signal of the height sensor.

Figure 7:
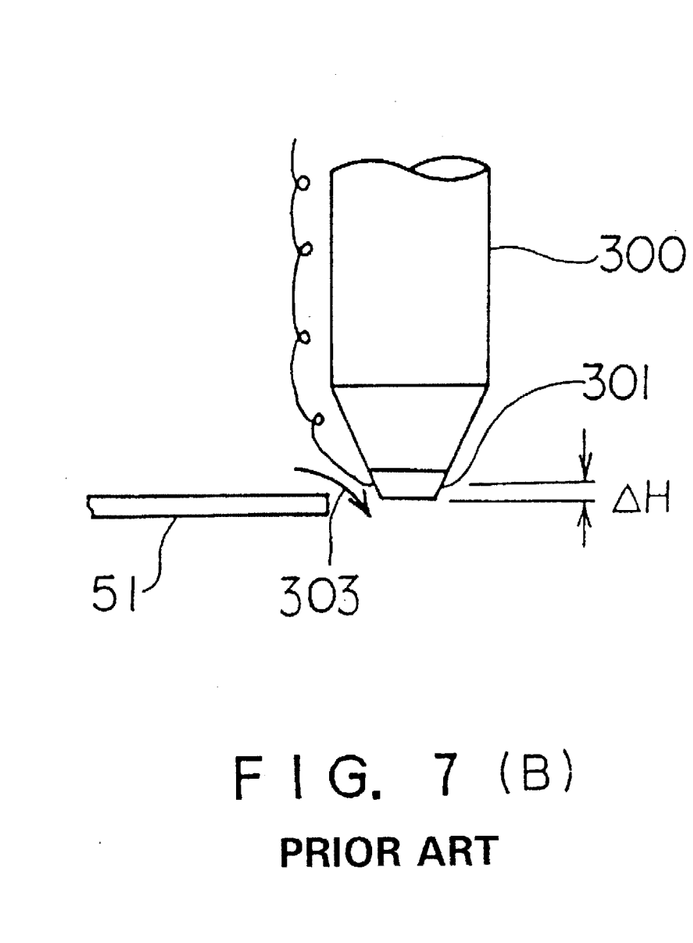

FIGS. 7(A) and 7(B) are diagrams illustrating the range to which the movement of the machining head is restricted. As shown in (A) of FIG. 7, while the machining head 300 moves above the workpiece 51 in the direction of arrow 302, the height of the machining head 300 relative to the workpiece 51 is kept constant by the height control based on the detection signal of the height sensor 301. When the machining head 300 reaches an end of the workpiece 51, however, it tends to lower suddenly in the direction of arrow 303 so as to maintain the height thereof constant. Conventionally, therefore, a range ΔH is set to restrict such lowering, and a stop signal is output when the range ΔH is exceeded.

In either of the above methods, the workpiece is only indirectly detected, and a presence or absence of a workpiece cannot be detected with accuracy. Thus, the conventional methods fail to provide effective measures against the sudden lowering of the machining head.

SUMMARY OF THE INVENTION

The present invention was created in view of the above circumstances, and an object thereof is to provide a laser beam machine capable of carrying out proper tracing control with ease.

Another object of the present invention is to provide a laser beam machine capable of detecting the presence/absence of a workpiece with accuracy.

To achieve the above objects, the present invention provides a laser beam machine for machining a workpiece in accordance with a command from a numerical control device, comprising height detecting means for detecting a height of a machining head relative to the workpiece, tracing control means for carrying out tracing control of the machining head so as to maintain the height of the machining head at a predetermined height, workpiece detecting means for detecting presence or absence of the workpiece at a distal end of the machining head, and tracing interrupt signal output means for outputting a tracing interrupt signal when the workpiece becomes undetected by the workpiece detecting means, to thereby interrupt the tracing control.

The height detecting means detects the height of the machining head relative to the workpiece. The tracing control means executes the tracing control of the machining head so as to maintain the height of the machining head at the predetermined height. The workpiece detecting means detects the presence or absence of the workpiece at the distal end of the machining head. The tracing interrupt signal output means outputs the tracing interrupt signal when the workpiece becomes undetected by the workpiece detecting means, to thereby interrupt the tracing control.

There is also provided a laser beam machine for machining a workpiece with a laser beam emitted from a machining head thereof, which comprises reference beam emitting means for irradiating a reference beam onto the workpiece, reference beam detecting means for detecting the reference beam reflected at the workpiece, and workpiece detecting means for determining whether the workpiece is present or absent, based on a detection signal of the reference beam and notifying the presence or absence of the workpiece.

The reference beam emitting means irradiates the reference beam onto the workpiece, and the reference beam detecting means detects the reference beam reflected at the workpiece. The workpiece detecting means determines whether the workpiece is present or absent, based on the detection signal from the reference beam detecting means and notifies the presence or absence of the workpiece.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 7(A) (PRIOR ART) and 7(B) (PRIOR ART) are diagrams illustrating how the range of movement of a machining head is restricted.

DESCRIPTION OF THE PREFERRED EMBODIMENTS

Embodiments of the present invention will be hereinafter described with reference to the drawings.

Figure 1:
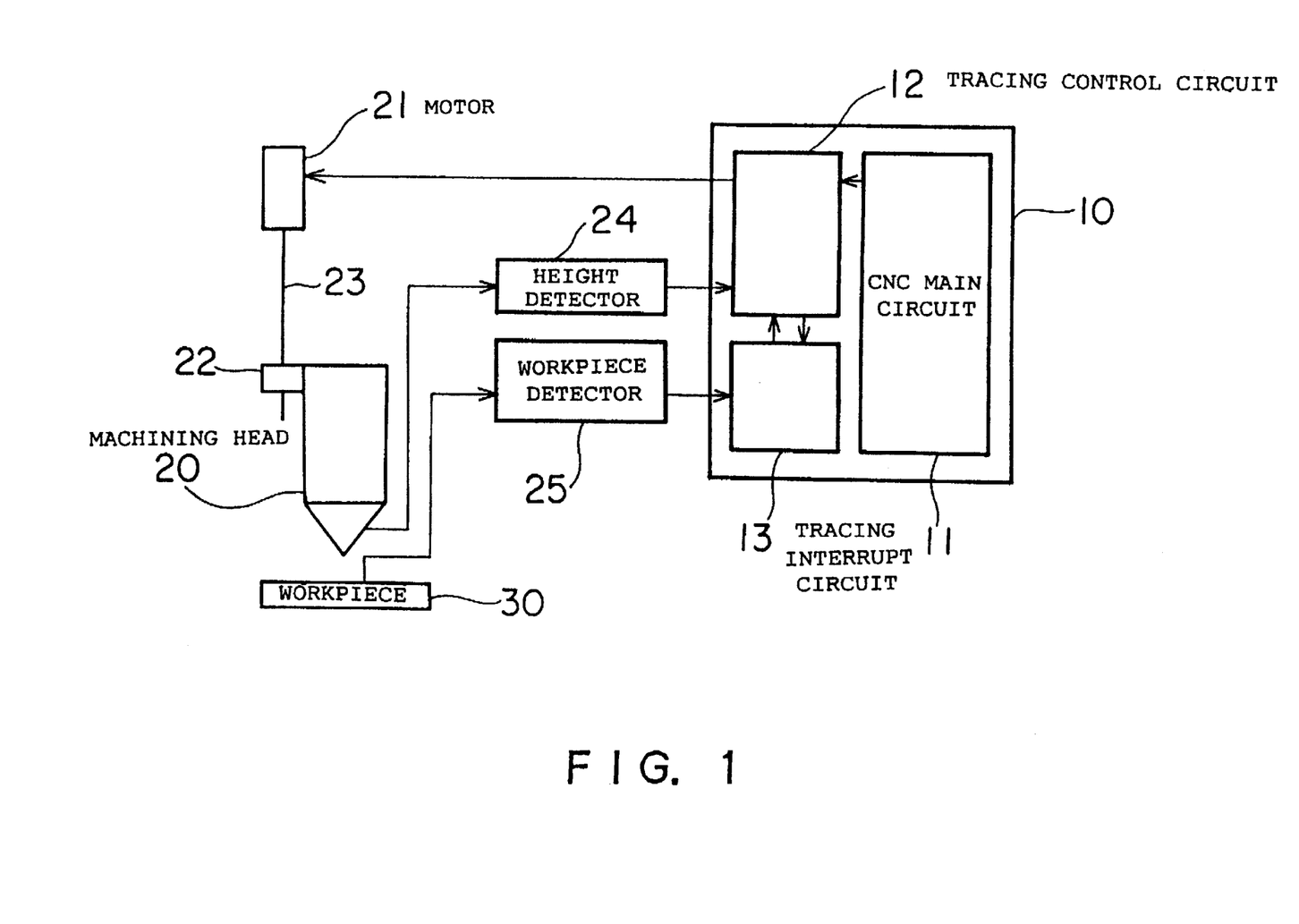
FIG. 1 is a diagram illustrating a laser beam machine equipped with a tracing control system according to the present invention.

FIG. 1 is a diagram illustrating a laser beam machine equipped with a tracing control system according to the present invention. As illustrated, a machining head 20 of a numerically controlled machine tool is provided with a height detector 24. For example, the height detector 24 is of the type which measures the electrostatic capacity between a workpiece 30 and a nozzle tip at a distal end of the machining head 20. The height detector 24 detects a height of the machining head 20 relative to the workpiece 30, and outputs a detection signal to a tracing control circuit 12 forming part of a numerically controlled machine tool (CNC) 10. On receiving a tracing start command from a CNC main circuit 11, the tracing control circuit 12 carries out tracing control. Specifically, the tracing control circuit 12 receives the detection signal from the height detector 24, and outputs a drive signal to a motor 21 such that the height of the machining head 20 is kept within a predetermined range. Rotation of the motor 21 is transmitted via a ball screw 23 and a nut 22, whereby the height of the machining head 20 is kept within the predetermined range.

According to this tracing control, the height of the machining bead 20 is maintained at a value dependent on a deviation ($E-E_0$) of the detection signal E of the height detector 24 from a control target value $E_0$. In general, this is achieved by setting a velocity command V for the control axis (motor 21) of the machining head 20 such that $V=K \times (E-E_0)$ is fulfilled, where K represents a gain.

A workpiece detector 25 is also provided for detecting the presence or absence of the workpiece 30 at the distal end of the machining head 20. For the workpiece detector 25, an optical proximity switch is used, for example. When the workpiece 30 at the distal end of the machining head 20 is cut and drops as the machining operation advances, this state is detected by the workpiece detector 25, which then outputs a detection signal to a tracing interrupt circuit 13.

The tracing interrupt circuit 13, along with the tracing control circuit 12, constitutes part of the CNC 10. On receiving the detection signal from the workpiece detector 25, i.e., information indicating the absence of the workpiece 30 at the distal end of the machining head 20, the tracing interrupt circuit 13 outputs a tracing interrupt signal to the tracing control circuit 12.

When supplied with the tracing interrupt signal, the tracing control circuit 12 interrupts or suspends the tracing control. The machining head 20 thereafter moves in accordance with normal control operation executed by the CNC main circuit 11.

Details of the tracing control mentioned above will be explained with reference to FIG. 2.

Figure 2:
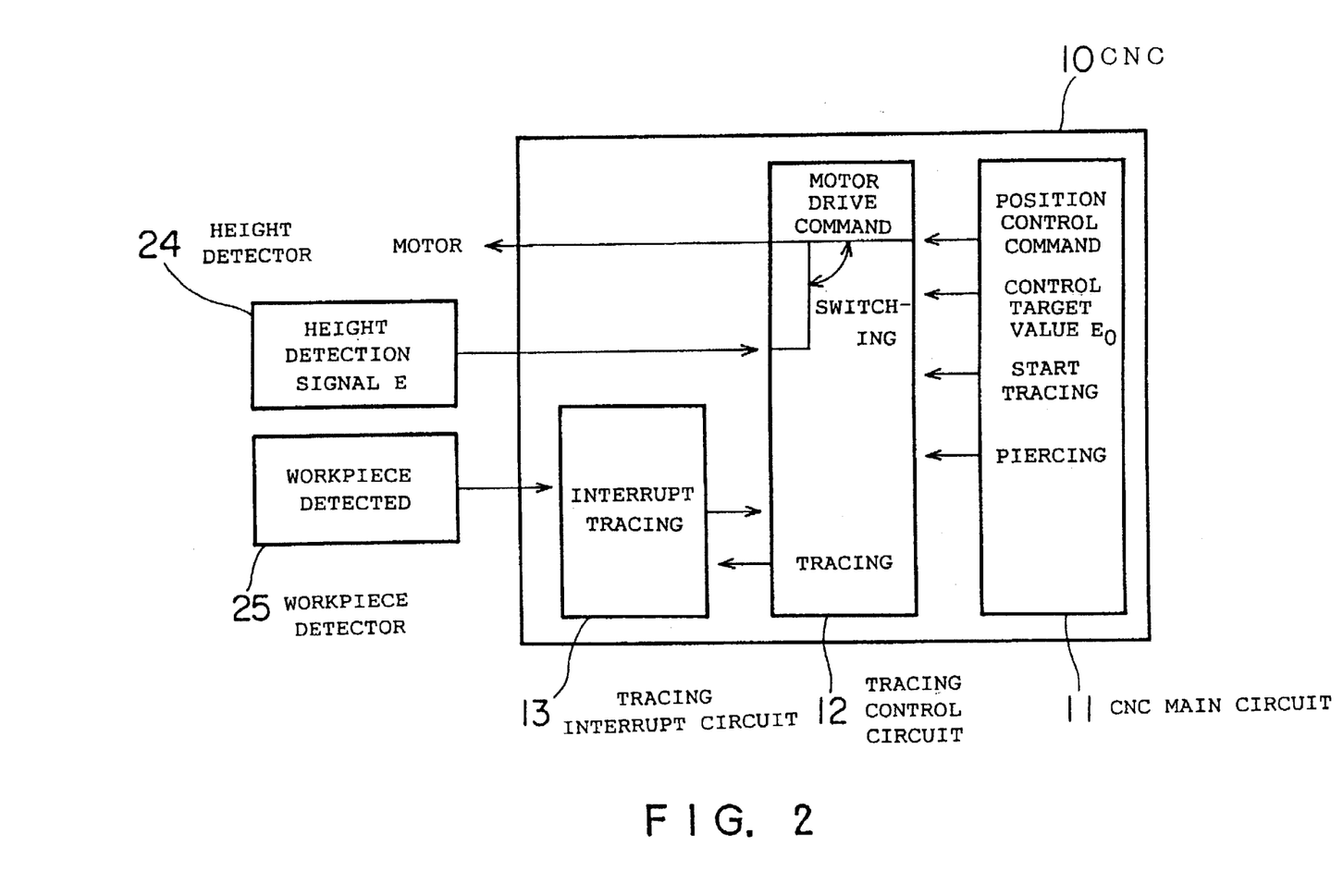
FIG. 2 is a diagram illustrating the operation according to tracing control.

FIG. 2 is a diagram illustrating the operation according to the tracing control. How the machining head 20 approaches the workpiece 30 at the start of machining will be explained first. The tracing control circuit 12 starts operating upon receiving the tracing start signal from the CNC main circuit 11. In this case, the machining head 20 and the workpiece 30 are set apart from each other at a distance beyond the range of detection of the workpiece detector 25. Accordingly, although the workpiece detector 25 supplies the tracing interrupt circuit 13 with information indicating the absence of the workpiece 30, the tracing interrupt circuit 13 does not output the tracing interrupt signal because it is not yet supplied with a tracing signal, which indicates that the tracing is under execution, from the tracing control circuit 12. Consequently, the tracing control is continued without interruption, and the tracing control circuit 12 outputs a motor drive command to the motor 21. In accordance with this command, the machining head 20 approaches the workpiece 30.

When the machining head 20 has reached a predetermined height, the workpiece detector 25 outputs a workpiece detection signal, and at the same time the tracing control circuit 12 outputs the tracing signal.

When the machining head 20 thereafter passes above a hole or an end of the workpiece during the machining, the workpiece detector 25 supplies the tracing interrupt circuit 13 with information indicating the absence of the workpiece 30. In this case, since the tracing signal is being supplied from the tracing control circuit 12, the tracing interrupt circuit 13 outputs the tracing interrupt signal to the tracing control circuit 12. As a result, the tracing control is interrupted, whereby the machining head 20 is prevented from lowering suddenly.

When the machining head 20 is again moved to a position above the workpiece 30, the workpiece detector 25 outputs the workpiece detection signal, which then is transferred to the tracing control circuit 12 via the tracing interrupt circuit 13, whereby the tracing control is restarted. Even when supplied with the workpiece detection signal, the tracing control circuit 12 continues to output the tracing signal. In this respect, the present embodiment differs from the system wherein the tracing control is started (restarted) in accordance with a CNC program or an external signal.

When a piercing signal, which indicates that piercing is under execution, is supplied from the CNC main circuit 11, the tracing control circuit 12 interrupts the tracing control upon receipt of the signal. During piercing, the output of the height detector 24 becomes unstable due to sputters (molten metal particles). For this reason, the tracing control based on the output of the height detector 24 is interrupted during piercing operation.

The control action executed by the tracing control circuit 12 will be explained in more detail.

(1) At Start of Tracing: The tracing start signal from the CNC main circuit 11 turns to "1". At this time, the motor drive command is switched from a position control command supplied from the CNC main circuit 11 to a velocity control command based on the height detection signal, as indicated by the following equation (1):

$$V = K \times (E - E_0) \quad (1)$$

where

E: height detection signal;

$E_0$: control target value; and

K: gain.

At this point of time, the value of the tracing signal is still "0", and when the relationship indicated by expression (2) below is fulfilled, the tracing signal value is set to "1":

$$|E - E_0| < \Delta E \quad (2)$$

where $\Delta E$: allowable value for height control.

(2) At Interruption of Tracing: When the tracing interrupt signal from the tracing interrupt circuit 13 turns to "1", $(E - E_0)$ in equation (1) is set to "0" (i.e., $(E - E_0) \to 0$). Consequently, V=0 and the relationship $|E - E_0| < \Delta E$ is satisfied, whereby the tracing control is interrupted.

When the tracing interrupt signal from the tracing interrupt circuit 13 thereafter turns to "0", $(E - E_0)$ in equation (1) is reset to a value dependent upon the height detection signal.

(3) At Stop of Tracing: When the tracing start signal from the CNC main circuit 11 turns to "0", a switching is effected from the velocity control command based on the height detection signal to the position control command supplied from the CNC main circuit 11. Also, the tracing signal value is set to "0".

Figure 3:
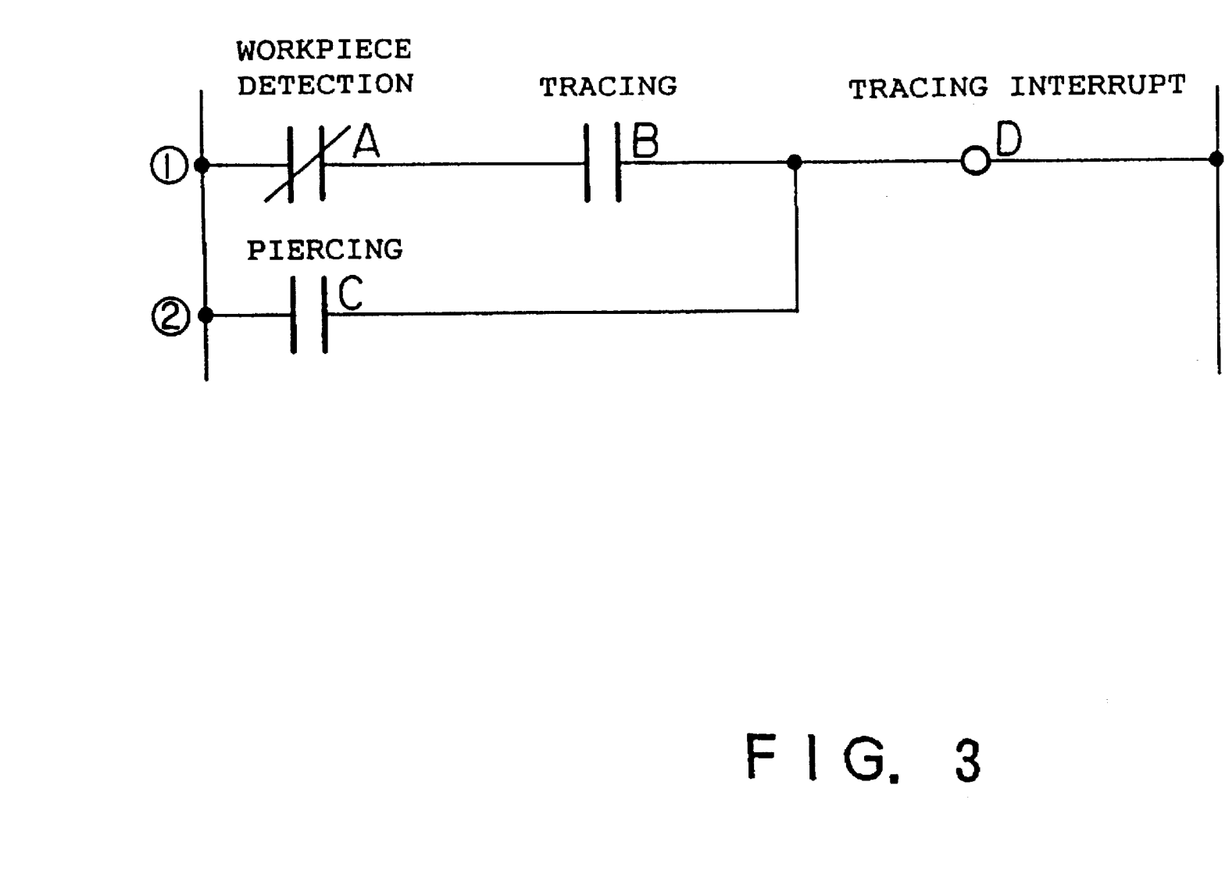
FIG. 3 is a diagram illustrating a tracing interruption during piercing.

FIG. 3 is a diagram illustrating the interruption of the tracing during piercing operation. The figure shown is a ladder diagram. When a contact C, which indicates piercing operation, is ON, a contact A indicating the workpiece detection signal is OFF and the tracing signal B is ON. While in this state, a coil D indicating tracing interruption is ON. As a result, the tracing control is interrupted.

As described above, in the present embodiment, the tracing control is continued or interrupted in accordance with whether a workpiece is present or not and whether the piercing is under execution or not. It is, therefore, possible to prevent the machining head 20 from unexpectedly lowering during machining operation. Also, it is possible to prevent unstable tracing operation during piercing. These operations are executed automatically, making it unnecessary to specify the corresponding functions in the program.

According to the present invention, the tracing control is continued or interrupted in accordance with whether a workpiece is present or not and whether the piercing is under execution or not, as mentioned above. Thus, it is possible to prevent the machining head from unexpectedly lowering during machining operation. Also, unstable tracing that can occur during piercing operation is prevented.

Further, these operations are executed automatically, making it unnecessary to specify the corresponding functions in the program.

A laser beam machine according to the present invention, which carries out machining while controlling the height of the distal end of the machining head, will be now described.

Figure 4:
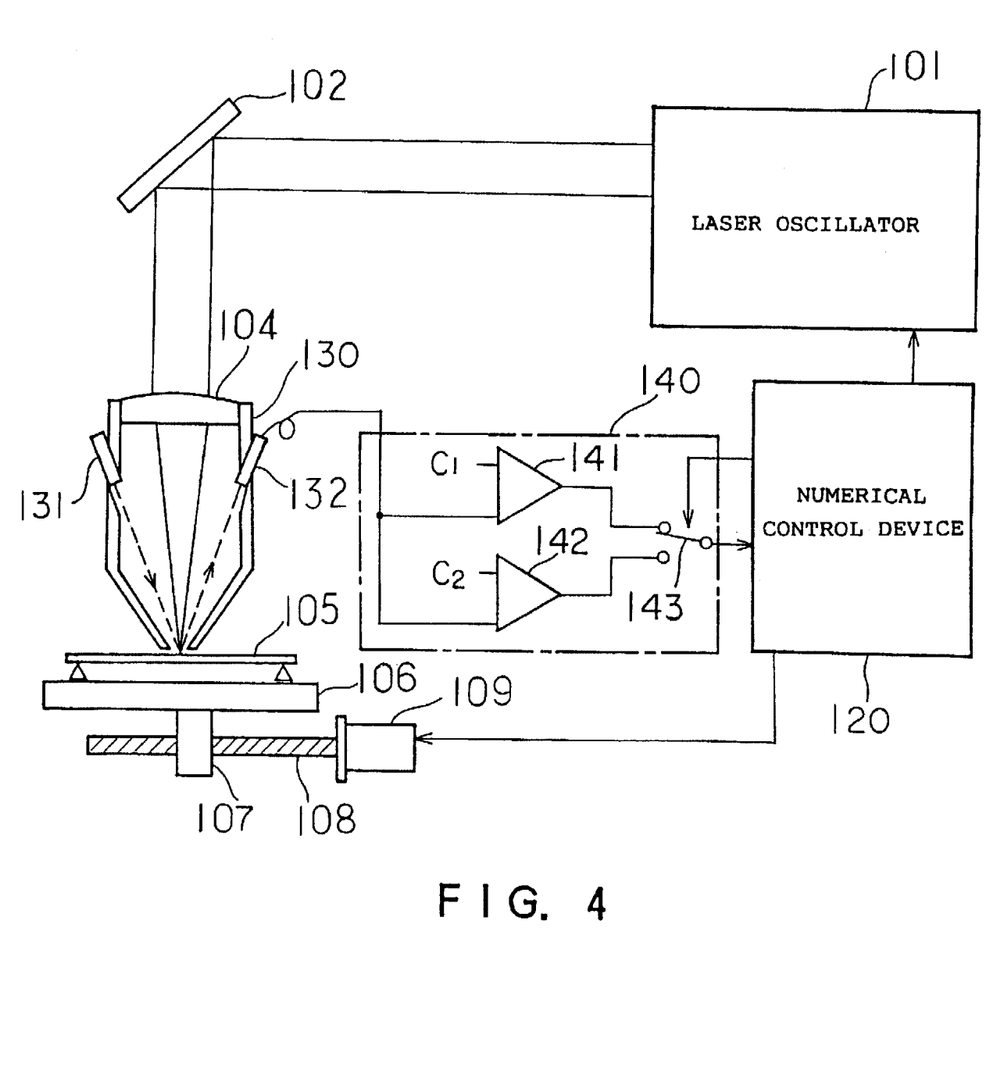
FIG. 4 is a diagram illustrating the entire arrangement of a second laser beam machine according to the present invention.

FIG. 4 is a diagram illustrating the entire arrangement of a second laser beam machine according to the present invention. In the figure, a laser oscillator 101 is, for example, a carbon dioxide gas laser oscillator, and the laser output thereof is controlled in accordance with a command from a numerical control device 120. A laser beam emitted from the laser oscillator 101 is reflected at a reflecting mirror 102 toward a machining head 130, is converged by a light converging lens 104, and then irradiated onto a workpiece 105 through the distal end of the machining head 130.

The workpiece 105 is fixed on a table 106. Movement of the table 106 is controlled in accordance with a command from the numerical control device 120. Specifically, the numerical control device 120 controls the rotation of a servomotor 109, and the rotation of the servomotor 109 is transmitted to the table 106 via a ball screw 108 and a nut 107, whereby the movement of the table 106 is controlled.

The numerical control device 120 is supplied with a detection signal from a height sensor (not shown) mounted to the distal end of the machining head 130, and performs tracing control to maintain the height of the machining head 130 (the distance between the machining head 130 and the workpiece 105) at a fixed value.

A reference beam emitting unit 131 and a reference beam detector 132 are fixed to a side wall of the machining head 130. The reference beam emitting unit 131 irradiates a reference beam onto the workpiece 105 located near the distal end of the machining head 130, and the reference beam detector 132 detects the reference beam reflected at the workpiece 105. The detection signal of the detector 132 is supplied to a light quantity discriminating unit 140. During laser beam machining, the reference beam detector 132 detects radiant light generated due to high temperature of the workpiece, in addition to the reference beam, as described later; therefore, a beam having the same wavelength range as the radiant light is used as the reference beam.

The light quantity discriminating unit 140 includes two discriminators 141 and 142, and a switching between the two discriminators is effected by a switch 143 responsive to a command from the numerical control device 120. Specifically, the numerical control device 120 connects the switch 143 to the discriminator 142 when it judges that a laser beam is being output, and connects the switch 143 to the discriminator 141 while no laser beam is output.

The reference beam reflected at the workpiece 105 is received by the reference beam detector 132, as mentioned above, and the detection signal of the detector 132 is supplied to the discriminator 141. A discriminating reference value (threshold value) $C_1$ is set in the discriminator 141, and when the detection signal becomes lower than the reference value $C_1$, the discriminator 141 outputs a signal to notify the numerical control device 120 that the workpiece has been cut and dropped.

During laser beam machining, the reference beam detector 132 also receives the radiant light generated due to high temperature of the workpiece, and the detection signal of the detector 132 is supplied to the discriminator 142. A discriminating reference value (threshold value) $C_2$ is set in the discriminator 142, and when the detection signal becomes lower than the reference value $C_2$, the discriminator 142 outputs a signal to notify the numerical control device 120 that the workpiece has been cut and dropped.

The two discriminators 141 and 142 are provided because the light generated during the laser beam machining has a higher level than the reference beam and thus while the laser beam is output, the discriminating reference value must be set to a correspondingly large value. Using the two discriminators makes it possible to determine the presence or absence of the workpiece 105 by means of the reference beam while no laser beam is output, and also to determine the presence or absence of the workpiece 105 by means of the light radiated from the workpiece during laser beam machining while the laser beam is output.

In this manner, the reference beam emitting unit 131 and the reference beam detector 132 are provided to directly detect the workpiece 105. Thus, the presence or absence of the workpiece 105 can be directly detected in a non-contact fashion and separately from the information about the distance between the machining head 130 and the workpiece 105. Therefore, during the tracing control, for example, it is possible to prevent the machining head 130 from suddenly lowering when the cut workpiece 105 drops.

While the laser beam is output, light generated due to laser beam machining and having a higher level than the reference beam enters the reference beam detector 132. In this case, since the reference value used is changed, the presence or absence of the workpiece 105 can be reliably detected even though the laser beam is output.

If it is detected that the workpiece 105 has dropped, then it means that the cutting is complete. In such a case, the laser beam machining is automatically ended, for example, whereby erroneous operation of the laser beam machine can be prevented and the laser beam machining operation can be automated and executed at high speed.

Figure 5:
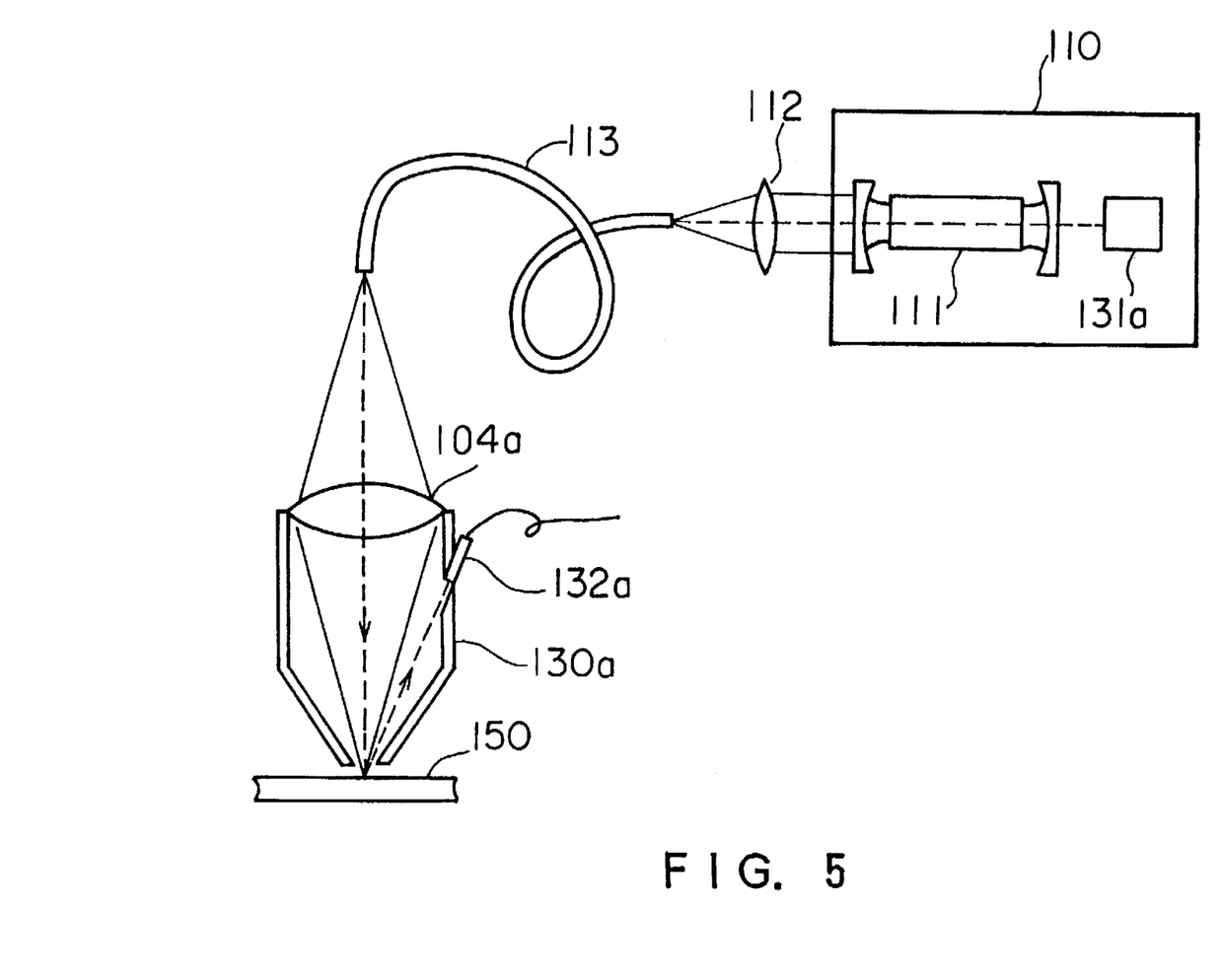
FIG. 5 is a diagram illustrating the arrangement of part of a third laser beam machine according to the present invention.

FIG. 5 is a diagram illustrating the arrangement of part of a third laser beam machine according to the present invention. The figure illustrates only the differences from the second laser beam machine, and since the numerical control device 120 and the light quantity discriminating unit 140 are identical with the corresponding elements of the second laser beam machine, they are not shown in FIG. 5.

In FIG. 5, a laser oscillator 110 is a YAG laser. A laser beam emitted from a YAG laser body 111 passes through a light converging lens 112 and enters an optical fiber 113, and the beam guided through the fiber 113 enters a machining head 130a. The laser beam incident on the machining head 130a is converged by another light converging lens 104a and then irradiated onto a workpiece 150 through the distal end of the machining head 130a.

A reference beam emitting unit 131a is arranged within the laser oscillator 110 on one side of the YAG laser body 111 opposite the converging lens 112. For the reference beam emitting unit 131a, a semiconductor laser serving as a source of probe light is used, for example. A reference beam emitted from the reference beam emitting unit 131a enters the YAG laser body 111, then is superposed on the laser beam, and follows the path of the laser beam to reach the workpiece 150. The reference beam is reflected at the workpiece 150 and falls upon a reference beam detector 132a fixed to a side wall of the machining head 130a. The reference beam detector 132a supplies the detection signal to the discriminator 141.

Thus, the reference beam is superposed on the laser beam before it is irradiated onto the workpiece. It is, therefore, unnecessary to arrange the reference beam emitting unit 131a on the side of the machining head 130a, and the machining head 130a, which needs to be moved, can be reduced in weight.

As described above, according to the present invention, the reference beam emitting means and the reference beam detecting means are provided to directly detect a workpiece. Accordingly, the presence or absence of a workpiece can be directly detected in a non-contact manner and separately from the information about the distance between the machining head and the workpiece. Thus, during the tracing control, for example, it is possible to prevent the machining head from suddenly lowering when the cut workpiece drops.

While the laser beam is output, the reference beam detecting means receives light having a higher level than the reference beam. In this case, the reference value used is changed, whereby the presence or absence of the workpiece can be reliably detected even while the laser beam is output.

If it is detected that the workpiece has dropped, then it means that the cutting is complete. In such a case, the laser beam machining is automatically ended, for example, whereby erroneous operation of the laser beam machine can be prevented and the laser beam machining operation can be automated and carried out at high speed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for machining a workpiece in accordance with a command from a numerical control device, comprising:

height detecting means for detecting a height of a machining head relative to the workpiece;

tracing control means for performing a tracing control of the machining head so as to maintain the height of the machining head at a predetermined height;

workpiece detecting means, separate from said height detecting means, for detecting a presence or an absence of the workpiece at a distal end of the machining head; and tracing interrupt signal output means for outputting a tracing interrupt signal when said workpiece detecting means detects said absence of said workpiece, to thereby interrupt the tracing control performed by said tracing control means.

2. The apparatus according to claim 1, wherein said tracing control means outputs a tracing signal, indicating that tracing is under execution, to said tracing interrupt signal output means upon receiving a tracing start signal, and said tracing interrupt signal output means outputs the tracing interrupt signal only when supplied with the tracing signal from said tracing control means.

3. The apparatus according to claim 1, wherein said tracing interrupt signal output means outputs the tracing interrupt signal when supplied with a piercing signal indicating that a piercing operation is under execution.

4. A laser beam machine for transmitting a laser beam to a machining head and machining a workpiece with said laser beam emitted from said machining head, comprising:

reference beam emitting means for irradiating a reference beam onto the workpiece;

reference beam detecting means for detecting the reference beam reflected from the workpiece and outputting a first detection signal of said reference beam, and for detecting light generated during the laser beam machining and outputting a second detection signal; and workpiece detecting means for presetting a first threshold value for the reference beam and a second threshold value for the light, and for determining whether the workpiece is present or absent based on both said first detection signal of the reference beam and said second detection signal of the light and by selectively using one of said first and second threshold values in accordance with a machining state.

5. The laser beam machine according to claim 4, wherein said reference beam emitting means and said reference beam detecting means are arranged within the machining head.

6. The laser beam machine according to claim 4, wherein said reference beam emitting means is arranged at a location such that the reference beam therefrom is superposed on the laser beam.

7. The laser beam machine according to claim 4, wherein said workpiece detecting means determines that the workpiece has dropped when the first detection signal outputted from said reference beam detecting means becomes smaller than said first threshold value.

8. The laser beam machine according to claim 4, wherein said reference beam emitting means emits said reference beam having a wavelength range identical to that of the light generated during the laser beam machining.

* * * * *